United States Patent Office 3,405,446
Patented Oct. 15, 1968

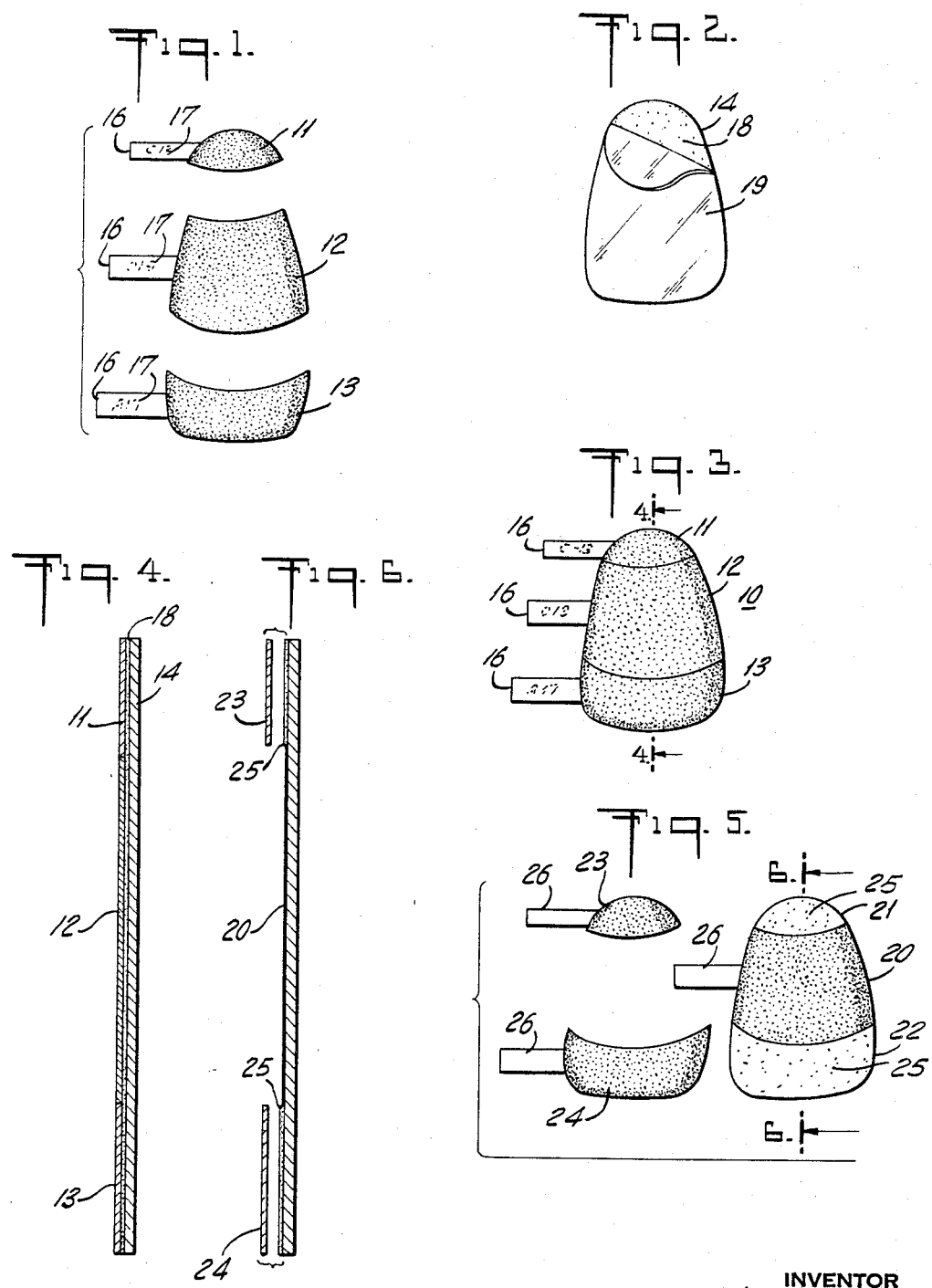

3,405,446
TOOTH COLOR MATCHING APPARATUS
William Wiener, 9411 Shore Road,
Brooklyn, N.Y. 11209
Filed Sept. 17, 1965, Ser. No. 488,002
8 Claims. (Cl. 32—1)

ABSTRACT OF THE DISCLOSURE

A tooth color classifying system includes a mounting web having the outline of a tooth and a pressure-sensitive adhesive face. Three series of hue elements are provided, the hue elements in each set being of the outline of a particular section of the tooth and of different hues and bearing indicia identifying the respective hue. The dentist selects a hue element from each series matching that of a corresponding section of a patient's tooth and adheres them to the mounting web to form a representation of the tooth. The assembled tooth representation may be further matched to the tooth by the use of colored panels.

---

The present invention relates generally to the production of artificial teeth and it relates more particularly to an improved apparatus and method for classifying and reproducing the hue or color and shade of a subject's natural teeth, that is, the color and shading thereof, in artificial teeth.

In the production of artificial teeth such as crowns, bridge work and dentures, a major problem is the proper coloring and shading of the artificial teeth so that they suitably match the natural teeth of the subject and are not visibly distinguishable therefrom. In the conventional practice for the production of artificial teeth, following the shaping of the anchoring or abutment teeth the dentist produces a cast of the subject's mouth in the area of the proposed restoration and transmits the cast to the laboratory for the production of the restoration anchored to a previously prepared abutment. The dentist either designates the desired color of the artificial teeth by comparing variously colored standard teeth conventionally available for shade guide purposes with those of the subject and advising the laboratory of such selected standard teeth by appropriate designations or the subject visits the laboratory and a technician determines the desired restoration coloring. Both of these practices possess many drawbacks and disadvantages. Where the dentist classifies the subject's tooth colors by resort to standard teeth, there is only a very little choice since the number of standard teeth are limited and there is no procedure for indicating variations therefrom particularly sectional and local variations. On the other hand, where the subject is sent to the dental laboratory, he is out of the control of the dentist and there is frequently a loss of suitable responsibility and professional judgment.

It is therefore a principal object of the present invention to provide an improved method and apparatus for the production of artificial restorations.

Another object of the present invention is to provide an improved apparatus and method for the classification of the color and shading of natural teeth attendant to the production of artificial restorations.

Still another object of the present invention is to provide an improved system of classifying and identifying the color and shading of natural teeth which permits a dentist to advise a dental technician thereof whereby to facilitate the production of artificial restorations over a wide range of color and shading as well as local variations.

A further object of the present invention is to provide an apparatus and method of the above nature character- ized by their versatility, simplicity, adaptability, reliability and ease of use.

The above and other objects of the present invention will become apparent from a reading of the following description taken in conjunction with the accompanying drawing wherein:

FIGURE 1 is a front elevational expanded view of a set of hue classifying elements;

FIGURE 2 is a front elevational view of a base member with the protective layer being shown partially removed;

FIGURE 3 is a front elevational view of an assembled set of classifying elements;

FIGURE 4 is a sectional view taken above line 4—4 in FIGURE 3;

FIGURE 5 is a front elevational expanded view of another embodiment of the present invention; and FIGURE 6 is a sectional view taken above line 6—6 in FIGURE 5 of an assembled set of elements.

In a sense the present invention contemplates the provision of an apparatus for color classifying of restorations, comprising a plurality of series of differently hued elements, the elements of each series defining a predetermined section of a tooth and a set of individual elements selected from each series being assemblable into a unit defining the full tooth, and indicia carried by each of said elements identifying the hue thereof.

In accordance with a preferred form of the present apparatus, the classifying elements are formed of sheets which are printed in the various hues of natural teeth and are shaped to representation of different sections of a corresponding tooth so as to be interfitted to form the respective tooth. A base member having the form of the tooth outline is provided with a layer of a pressure-sensitive adhesive so that the color classifying elements may be assembled therewith. Each of the color classifying elements is provided with a tab carrying information related to the respective section, particularly the color thereof.

Referring now to the drawing, and particularly FIGURES 1 to 4 thereof, which illustrate a preferred embodiment of the present invention, the reference numeral 10 generally designates an assembled tooth representation which includes tooth section hue-classifying elements 11, 12 and 13 and a base or assembly-support 14. The base support 14 is of the shape or outline of the particular tooth, which is to be hue-classified, and the elements, 11, 12 and 13, are of the shapes of the gingival, body and incisal sections, respectively, of the corresponding tooth.

The base member, 14, and the hue-classifying elements, 11, 12 and 13, are advantageously enlarged to facilitate the handling thereof and the classifying elements are provided with corresponding mating edges so that they may be interfitted to form the full tooth. The base, 14, and the elements 11, 12 and 13, are advantageously formed of other flexible sheet or film, such as paper, cellophane, cellulose acetate or the like.

The present apparatus includes one or more series of each of the classifying elements, 11, 12 and 13, each member of each series of classifying elements being of a different hue so as to match the various hues which occur in the respective section of natural teeth, the degree of gradation, being as desired. Attached to each of the classifying elements 11, 12 and 13 is a tab 16, which carries indicia or information 17, identifying the hue of the respective classifying section and other desirable data. The various series of classifying elements 11, 12 and 13 may be stored in any suitable fashion in a related manner ready for selection and use, such as in bound or booklet form or in a compartmented tray or cabinet. The elements 11, 12 and 13 are colored in any known manner, such as, by printing or the like, and the colored faces advantageously possess the gloss of the natural tooth to facilitate the proper matching thereof.

The base member 14 is neutral or colorless and is provided in a face thereof with an adhesive 18 preferably, a pressure-sensitive adhesive to facilitate the securement of a set of classifying elements, 11, 12 and 13, thereto. The adhesive coating 18 as covered, in the known manner, with a removable sheet 19 which protects the adhesive 18 until its use is desired.

In employing the tooth hue-classifying apparatus described above, the dentist matches the classifying elements 11, 12 and 13, with corresponding sections of the teeth bordering the space which is to receive the artificial restoration until a set of classifying elements are obtained which desirably match the tooth. The sheet 19 is then separated from a base member 14 and the selected set of classifying elements 11, 12 and 13, are assembled in an interfitting relationship by adhering them to corresponding areas of the adhesive face of the base member 14 to form the assembly as shown in FIGURES 3 and 4. The dentist produces as many assemblies 10 as will probably hue-classify all of the teeth of the proposed restoration in the manner described above.

In addition to the various series of classifying elements 11, 12 and 13, which it should be noted are provided in various shapes corresponding to different tooth types, pencils are provided in colors corresponding to those of decalcification spots, and tobacco and other stains. Following the assemblying of the tooth member 10 the dentist may then mark the assemblies 10 in the desired areas with the differently colored pencils, to indicate the various spot areas and stains as well as their color. The dentist marks each of the assemblies 10 with any suitable identification relating it to its position on the restoration, and also may indicate the color identity of the pencil marked spots and stains. He then transmits the prepared group of assemblies 10 together with the conventional cast and instructions to the dental laboratory. The dental laboratory then fabricates the denture and colors it to match the information transmitted by the associated assemblies 10 and the other information furnished it in the usual manner. In this connection, the identification of the colors is greatly facilitated by the tab-carried indicia 17.

In FIGURES 5 and 6 of the drawing, there is illustrated another embodiment of the present invention which differs from that described above primarily in that the base member is supplied in a series of hues corresponding to a section of the tooth and the other selected tooth sections are adhered thereto.

Specifically, by way of example, there is provided a series of differently hued base or support members 20 of the shape of the base member 14, the areas 21 and 22 corresponding to the gingival and incisal areas and being coated with an adhesive 25 preferably of the pressure-sensitive type, the specific areas, if desired, being covered by removable panels. Also provided are series of different hued gingival and incisal hue-classifying elements, 23 and 24, the member 20 and the elements 23 and 24 being provided with information-carrying tabs, 26.

The use and application of the arrangement last described is similar to that first described.

While there have been described and illustrated preferred embodiments of the present invention, it is apparent that numerous alterations, omissions and additions may be made without departing from the spirit thereof.

What is claimed is:

1. A tooth color classifying device comprising a set of individual hue elements representing different sections of a respective tooth each of said set of hue elements being selected from a series of similarly shaped hue elements of different hues and carrying indicia identifying the hue thereof, and means for mounting said hue elements in an assembly representing said respective tooth.

2. The device of claim 1 wherein said mounting means comprises a base member backing said hue elements and means for securing said hue elements to said base member to form said tooth representing assembly.

3. The device of claim 1 wherein said hue elements are formed of flat webs and said mounting means comprises a web of the outline of said tooth, said hue elements being superimposed upon and secured to said mounting web.

4. The device of claim 3 wherein said securing means comprises a pressure sensitive adhesive between said backing web and said hue elements.

5. The device of claim 3 comprising three of said hue elements representing the incisal section, body section and gingival section respectively of said tooth.

6. The device of claim 3 wherein said mounting web has at least a section thereof colored and is selected from a series thereof of different hues, said hue elements being positioned on said mounting web to leave said section exposed.

7. The device of claim 3 wherein at least one of said hue elements has a heterogeneously hued face.

8. The apparatus of claim 3 wherein the front faces of said elements possess a gloss corresponding to that of natural teeth.

References Cited

UNITED STATES PATENTS 2,789,353    4/1957    Biggs _____ 32—71

OTHER REFERENCES

S. S. White General Catalog of Dental Supplies, 1934, p. 131.

LOUIS G. MANCENE, *Primary Examiner.*

R. PESHOCK, *Examiner.*